United States Patent [19]

Berdinner, Jr.

[11] 4,372,671
[45] Feb. 8, 1983

[54] SHOCK ABSORBING CARRIAGE DRIVE COUPLING FOR COPIER/DUPLICATORS

[75] Inventor: Edward J. Berdinner, Jr., Longmont, Colo.

[73] Assignee: International Business Machines Corporation, Armonk, N.Y.

[21] Appl. No.: 251,414

[22] Filed: Apr. 6, 1981

[51] Int. Cl.[3] ............................................. G03G 15/00
[52] U.S. Cl. ...................................... 355/8; 355/14 R; 430/494
[58] Field of Search ........................ 355/3 R, 14 R, 8; 64/27; 188/297; 430/494

[56] References Cited

U.S. PATENT DOCUMENTS

| | | | |
|---|---|---|---|
| 1,627,964 | 5/1927 | Galloway . | |
| 2,071,885 | 2/1937 | Lewis et al. | 64/27 |
| 2,626,028 | 1/1953 | Brougher | 192/33 |
| 2,959,095 | 11/1960 | Magnusson | 88/24 |
| 3,697,165 | 10/1972 | Morriston et al. | 355/8 |
| 3,914,046 | 10/1975 | Tanaka et al. | 355/15 |
| 3,918,806 | 11/1975 | Cook | 355/8 |
| 3,960,446 | 6/1976 | Ogawa et al. | 355/13 |
| 3,984,998 | 10/1976 | Rogakos et al. | 64/27 C |
| 4,148,578 | 4/1979 | Bujese | 355/8 |
| 4,158,499 | 6/1979 | Hattori et al. | 355/8 |
| 4,159,173 | 6/1979 | Kasuga | 355/14 R X |
| 4,171,901 | 10/1979 | Takizawa et al. | 355/8 |
| 4,192,608 | 3/1980 | Goshima et al. | 355/51 |
| 4,243,311 | 1/1981 | Tohyama et al. | 355/8 |
| 4,256,399 | 3/1981 | Ikeda | 355/8 |

OTHER PUBLICATIONS

Minolta EP310 Technical Manual I, Minolta Camera Co. Ltd., Jul. 1979, pp. 12-28.

*Primary Examiner*—A. C. Prescott
*Attorney, Agent, or Firm*—Earl C. Hancock

[57] ABSTRACT

A bidirectional mechanical power coupler between power input and output means provides a firm connection in one direction and a resilient coupling in the opposite direction, particularly operable immediately after a rapid reversal of the mechanical drive direction. The coupler interconnects a common power source in a copier/duplicator with a reciprocating carriage for original document scanning. It is preferably implemented with a single pulley of coaxial hubs with an interposing arm extending from one hub into a spring-retaining groove in another hub.

8 Claims, 6 Drawing Figures

SHOCK ABSORBING CARRIAGE DRIVE COUPLING FOR COPIER/DUPLICATORS

TECHNICAL FIELD

This invention relates to methods and apparatus employing a common mechanical drive source to operate a plurality of machine elements including a reciprocally moving carriage or the like, wherein the carriage dynamically reverses its movement direction. More particularly, the present invention relates to xerographic copier/duplicators having a main drive motor that is selectively coupled so that copy sheet paper processing elements function concurrently with the reciprocal motion of a carriage mechanism. The present invention is particularly well suited for use in small, low cost, xerographic copier/duplicators that employ photoconductor drums or belts which receive, develop and transfer original document images to copy sheets. Although not necessarily limited thereto, the present invention is particularly useful for copiers with carriage that hold the original document to be copied and move it past a scan window.

BACKGROUND ART

Xerographic type copiers using reciprocally movable carriages to provide scanning of a document or thing to be copied have been known for many years. Typically, these carriages have either held the optics such as lenses and mirrors which are moved so as to scan a fixed document, or have retained the document itself so as to move it past a fixed scan window and optic coupler. U.S. Pat. No. 2,959,095 is an example of the latter type of scanning system.

It is generally preferred, especially for low cost copiers, that the drive motor concurrently operates as many of the machine elements as possible. Frequently such systems employ mechanical and/or electromechanical switching elements that rapidly reverse the direction of traverse of the carriage. For low speed or table-top copiers, simple switching devices are preferred for this function because they minimize both cost and carriage reversal time. Unfortunately, such devices also cause brief deviations of power application to the other copier components because of the carriage inertia. This is not overly detrimental for systems wherein the image is directly transferred from the original document onto a photosensitive copy sheet, since image transfer is complete before carriage reversal occurs.

However, the result is different for systems using photoconductive belts or drums to receive the image which is carried for some distance from the imaging station (usually including some intermediary operation such as development) to the point of transfer to a copy sheet. Such systems frequently produce a short band of blurred copy on the copy sheet because the transfer function is still in progress at the time of carriage motion reversal unless the carriage scan motion is carried out excessively or the distance from image to transfer stations is made long enough so that transfer has not started at the time of carriage reversal. The two latter-mentioned options are unacceptable, particularly for compact, low cost copiers.

The only arrangement known in the prior art for decoupling the adverse effects of the reciprocating carriage motion reversal from the remainder of the machine operation is shown in U.S. Pat. No. 3,697,165 by Morriston et al. where the carriage is driven by a slotted link and link pin connected to follow motion of a closed loop chain. Separate switches at the 90° turns on each end of the chain reverse the drive motor coupling to the chain. This configuration is intended to cause direction reversal of the carriage at approximately the zero horizontal motion point of the yoke and link pin. Such a system requires acceptance of a substantial cost penalty for the additional parts, switches and circuitry.

Various shock absorbing mechanical couplers have also been known in the past, Lewis et al. U.S. Pat. No. 2,071,885 being one example. Lewis et al. shows retained springs to provide mechanical coupling between radial ears of driving and driven hubs. Despite the presence of such couplers in the prior art and the continued presence of the copier quality degradation problem stemming from carriage motion reversal, the prior art is devoid of any suggestion that the problem is resolvable through a combination in accordance with the present invention as described below.

DISCLOSURE OF THE INVENTION

The present invention is concerned with a copier/duplicator that has a plurality of moving, xerographic process-related elements. These moving elements include a photoconductively surfaced means, an image developing means and a copy sheet conveyor for transferring and thereafter fixing the image from the photoconductive surface onto copy sheets. A power source is connected to operate at least the conveyor. A carriage is movably mounted for reciprocating motion for scanning original documents, books or things to transfer the image to the photoconductive surface. An interconnecting means joins the power source to the carriage movable mount and is selectively operable for causing the carriage to move in a reciprocal motion sequence. This interconnecting means includes means establishing a relatively rigid mechanical coupler from power source to carriage mounting means when the carriage moves in one direction, whereas other means provides a force absorbing, resilient coupling when the carriage is being moved in the opposite direction.

The interconnecting means can advantageously take the form of coaxially mounted collars, one of which has a groove for retaining a compressibly resilient component with the other collar having a shoulder extending radially into that groove. Another feature of the interconnecting means is that the shoulder and groove can have mating faces sloped tangentially relative to the inner collar thereby forming a solid interface for one direction of carriage movement.

The foregoing and other objects, features, advantages and applications of the present invention will be readily apparent to those having normal skill in the art from the following, more detailed description of the exemplary preferred embodiments as illustrated in the accompanying drawings.

DETAILED DESCRIPTION OF THE PREFERRED EMBODIMENTS

Figure 1:
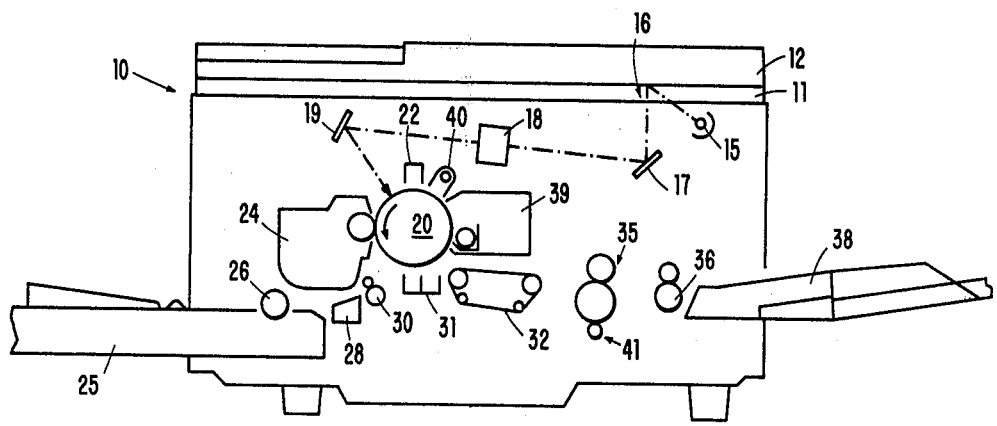
FIG. 1 is a view showing the various elements of a typical xerographic copier/duplicator.

The copier 10 of FIG. 1 electrostatically or xerographically copies original documents placed on a transparent platen on reciprocably movable carriage 11 under cover 12. The document is illuminated in a line by lamp 15 at the scan window location 16 so that the light image of the document as it moves past scan window 16 is transferred through mirror 17, lens 18 and second mirror 19. Ultimately the image is transferred to photoconductive surfaced drum 20.

Drum 20 is initially electrostatically charged by a corona 22. After the original document image has been transferred to drum 20, this image is developed by developer 24. Copy sheets stored in supply cassette 25 are selectively picked by picker roller 26 and driven into the conveyor feed path including guides 28, synchronization rollers 30, transfer/detach corona 31, vacuum belt transport 32, fuser rollers 35 and output drive rollers 36 onto exit tray 38. Finally, a toner cleaning and recirculating device 39 and a discharge lamp 40 complete the elements arrayed around drum 20. Also a fuser oil wicking device is shown generally at 41. All of the foregoing elements operate in a generally conventional manner.

Figure 2:
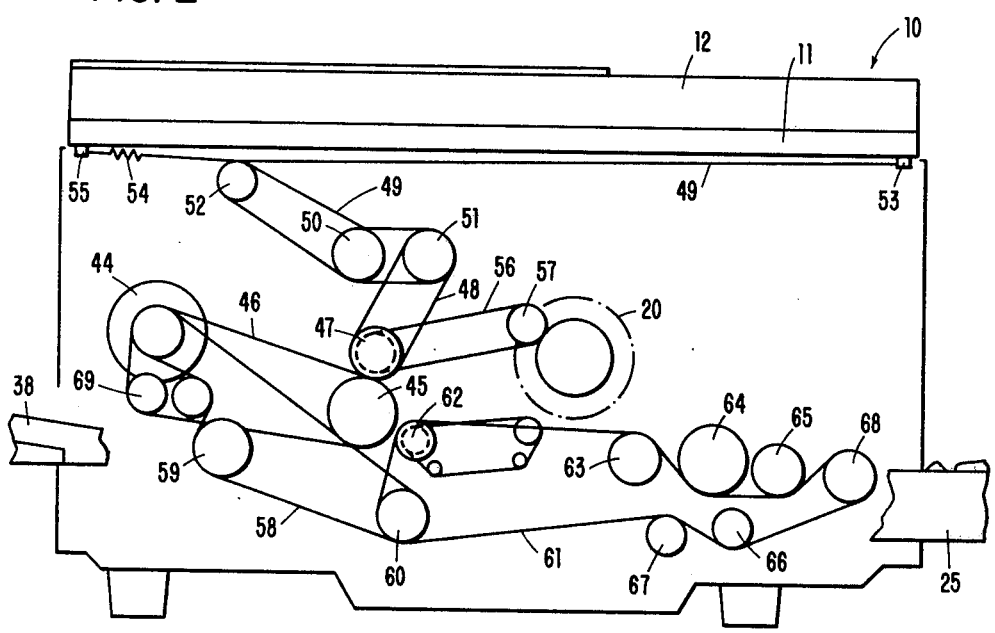
FIG. 2 is a rear view of the FIG. 1 copier/duplicator showing the mechanical coupling from a common power source motor to the xerographic elements.

FIG. 2 is a rear view of the FIG. 1 copier and generally illustrates the interconnections from a main drive motor 44 to the various elements associated with the xerographic process which require motivation. As is frequently the case for relatively low cost copiers, main drive motor 44 is coupled so as to power as many elements as possible. Thus motor 44 is connected to sprocket 45 by means of a chain or belt 46 with the rotary power from sprocket 45 selectively driving the rollers of fuser 35 (FIG. 1).

Note that sprocket or gear 45 is likewise coupled to a secondary gear 47 which is connected by means of belt 48 to a drive cable 49 and then to pulleys 50 and 51, as well as to a direct drive pulley 52. Cable 49 wraps around pulley 52 and is attached to one end of reciprocably movable carriage 11 as at post 53, whereas spring 54 connects cable 49 to post 55 at the opposite end. That is, cable 49 is attached to post 55 via spring 54 at one end, sequentially passes around pulleys 52, 50 and 51 (in that order), then returns past pulley 50 to wrap around pulley 52 and is then attached to post 53. This arrangement selectively drives carriage 11 through a reciprocation motion as will be described in greater detail later. Gear 47 is also coupled by belt 56 to a gear or pulley 57 for the purpose of driving drum 20. In this particular configuration, a separate drive motor is employed for the magnetic roller of the developer 24, and this second motor is not shown in FIG. 2.

The rotary mechanical drive output of motor 44 is coupled by belt 58 to gears 59 and 60 to drive exit rollers 36 while belt 46 also drives fuser oil wicking mechanism 41 by gear 69. Gear 60 further drives belt 61 which is connected to the vacuum belt drive by means of gear 62 and to the synchronization rollers 30 through gear 63. By other roller connections, the drive for picker rollers 26 is energized as by one of gears 64-67, while an emitter is coupled to gear 68.

Figure 3:
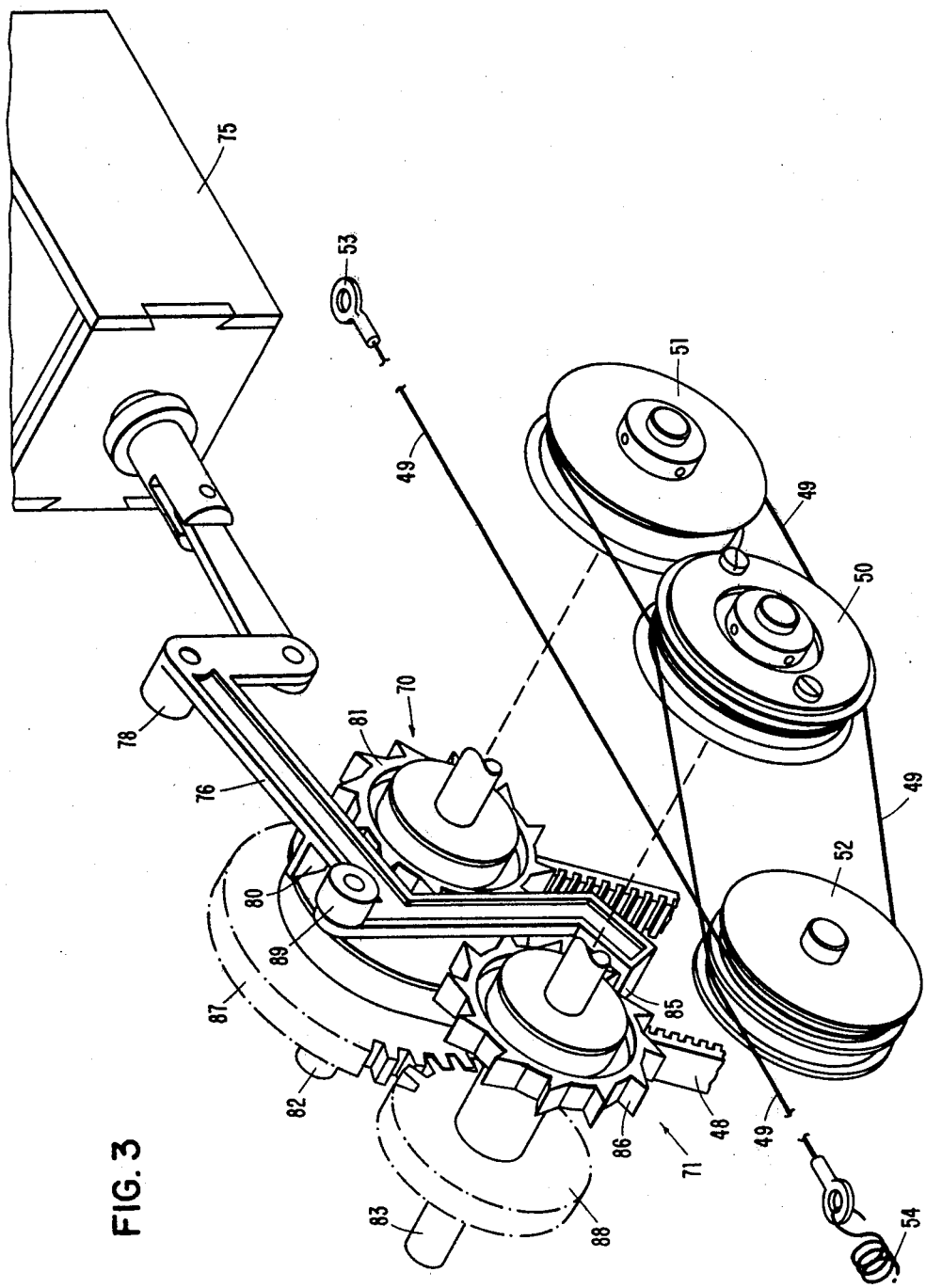
FIG. 3 is an isometric view of the bidirectional power drive arrangement for the reciprocating carriage of the FIG. 1 copier/duplicator.

FIG. 3 shows the general configuration for selectively driving the carriage in its reciprocating motion. Common drive belt 48 is coupled to either the forward scan or initial motion drive pulley 51 as by spring clutch 70, or to reverse scan pulley 50 by spring clutch 71. Solenoid 75 controls pawl 76 to perform this operation, as will be described below.

Pawl 76 pivots around shaft 78. With solenoid 75 actuated, pawl 76 is pulled inwardly toward solenoid 75 so that stub 80 engages gear 81. This causes the spring clutch 70 to actuate, as is well known, and couple rotary motion from main drive belt 48 to the scan pulley 51. Thus, cable 49 is driven around pulleys 50-52 so that carriage 11 is pulled by cable 49 so as to move in an initial scan direction, to the right in FIG. 1.

At the end of the scan, means not shown (e.g. an appropriately located mechanical switch, microprocessor timing, etc.) causes scan solenoid 75 to be released. As a result, the lower extension 85 of pawl 76 engages gear 86 causing spring clutch 71 to operate, thereby imparting reverse direction rotary motion to pulley 50. This reverse direction rotary motion is realized through the coupling of gears 87 and 88.

The carriage 11 then returns to its original home position with the initial reversing shock being absorbed through the mechanism incorporated into pulley 50, as will be described later. Once the carriage has reached its home position, nub 89 on pawl 76 enters a detent (not shown) and thus releases gear 86, and a full cycle of the drive to the carriage is completed.

Figure 4:
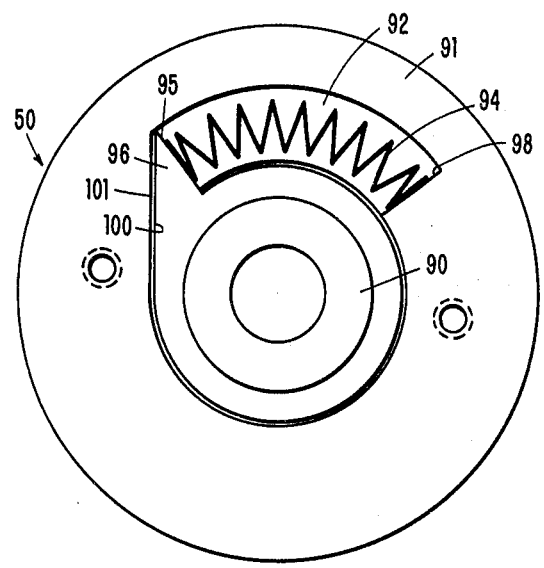
FIG. 4 is a plan view of the carriage drive shock absorbing coupler.
Figure 5:
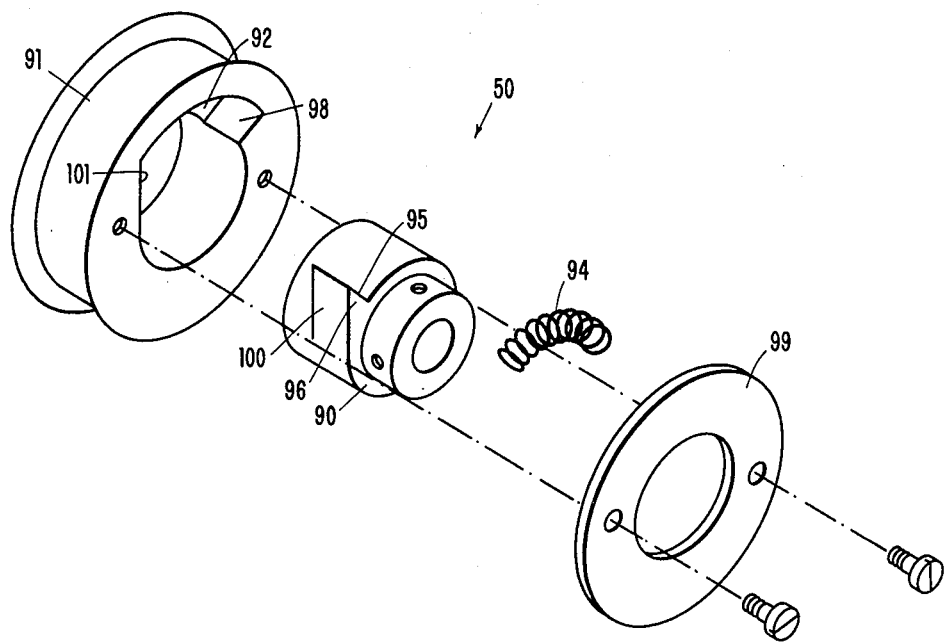
FIG. 5 is an exploded view of the FIG. 4 coupler.

FIG. 4 illustrates the carriage return pulley 50, and FIG. 5 is an exploded view of the parts thereof. The spring clutch drive shaft 83 is firmly attached to inner collar 90 which is coaxially mounted within outer collar 91. Outer collar 91 has an inwardly facing groove 92 in which a spring element 94 is retained between the end face 95 of shoulder 96 for inner collar 90 and end wall 98 of groove 92.

The elements are held together by a washer 99 suitably attached but only shown in FIG. 5. Shoulder 96 has a tangentially angled face 100 relative to the peripheral surface of collar 90 with face 100 engaging a similarly sloped face 101 on the opposite end of groove 92 in collar 91. This provides a solid, strong driving interface when the pulley 50 is rotating in the scan direction for carriage 11. Conversely, when the solenoid 75 is released, selection of gear 86 and thus spring clutch 71 occurs substantially instantaneously so that spring 94 is compressed thereby absorbing the reversal of motion and providing a relatively smooth deceleration and reverse direction acceleration of the carriage. Thus, the shock of carriage direction movement reversal is isolated from the other elements in the copier. That is, in a typical compact copier operation, the transfer of the image from drum 20 to a copy sheet would not normally be completed at a point in time when the movement direction for carriage 11 is reversed. The blurring effect caused by the shock upon the various couplings into the main drive motor 44 is absorbed by spring 94 and pulley 50 as described above. Thus, the shock is absorbed in a manner which is effective to remove the blurring problem while allowing maximum overall machine operating speed through attainment of the most immediate reversal of reciprocation for carriage 11. Further, these advantages are realized in a relatively low cost manner as compared to the previously known devices.

Figure 6:
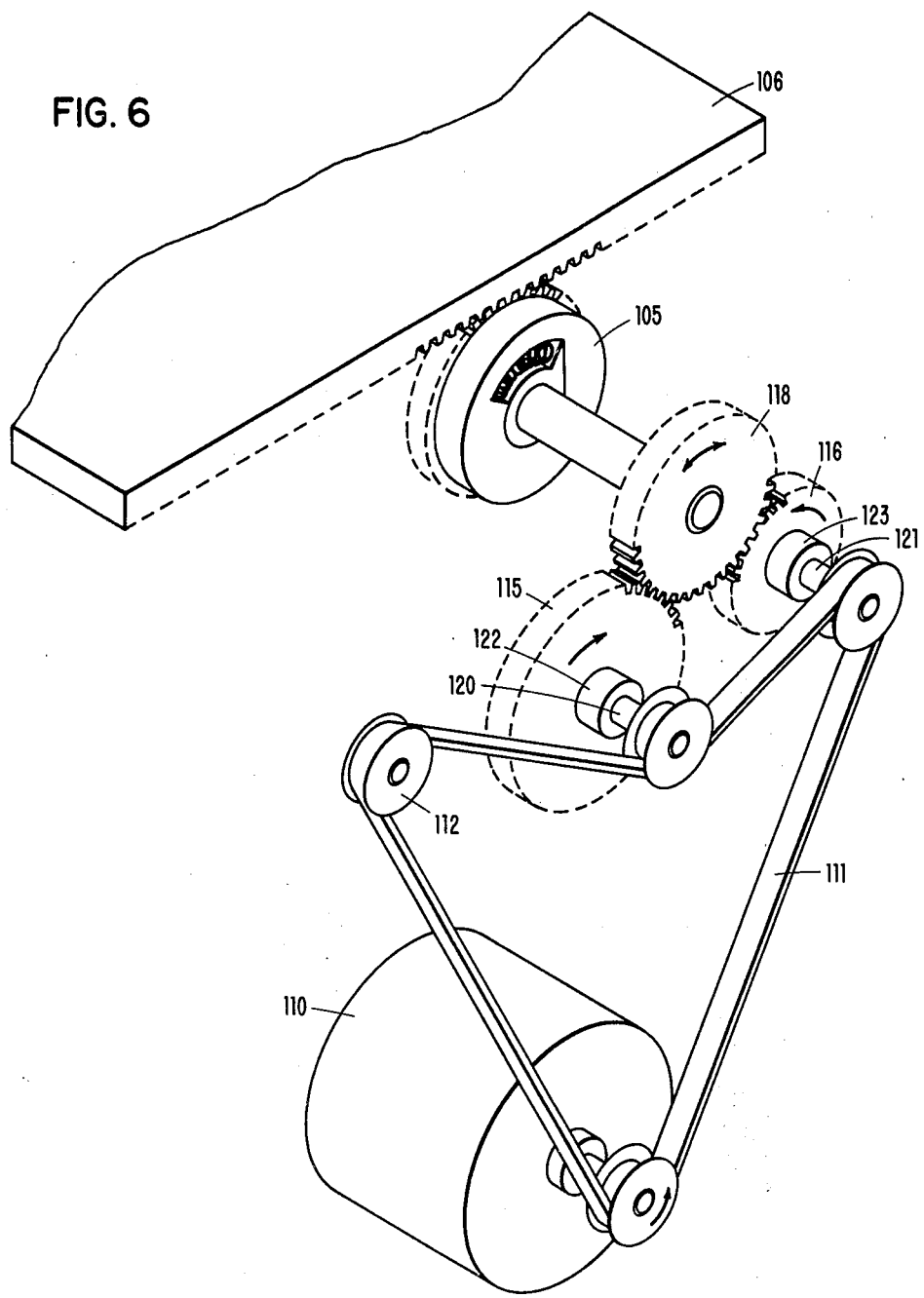
FIG. 6 is a diagrammatic view of another bidirectional carriage drive arrangement using the FIGS. 4 and 5 coupler.

FIG. 6 illustrates another implementation, in general form, wherein a single shock absorbing pulley 105 completely controls the reciprocable motion of a document carriage 106. Main drive motor 110 is connected to a drive belt 111 which passes around idler pulley 112 and then around pulleys attached to shafts 120 and 121 which selectively drive gears 115 and 116. Belt 111 reverses as it goes over the pulleys for drive shafts 120 and 121. Clutch mechanisms 122 and 123 which can be electromagnetic clutches, spring clutches or the like, interconnect drive shafts 120 and 121 into gears 115 and 116, respectively. Thus selection of clutching mechanism 123 couples power from belt 111 and shaft 121 into gear 116 and thus into gear 118. This causes the shock absorber pulley 105 to move in the direction of its solid coupling and to cause carriage 106 to scan to the right. Ultimately, clutch mechanism 123 is deactuated and clutch 122 is selected. Thus, gear 118 for pulley 105 now rotates in the opposite or home direction and pulley 105 provides shock absorber operation so as to decouple main drive motor 110 from its other mechanical components (not shown in FIG. 6).

Note that gear 115 is of a larger diameter than gear 116, thereby providing a faster return stroke for carriage 106 and thus reducing machine operating time per copy. Also note that the shock absorbing elements and drive shoulders of the pulley 105 are essentially in reversed orientation from that illustrated in FIGS. 4 and 5.

Although the present invention has been described with specificity as to the foregoing detailed description of the preferred embodiments, various changes, modifications, additions and applications other than those specifically mentioned herein will be readily apparent to those having normal skill in the art without departing from the spirit of this invention.

What is claimed is:

1. In a copier having a mechanical power source and a carriage mounted for reciprocal motion including movement in at least a scanning direction and a return direction, an improved means for interconnecting said power source and said carriage comprising:
   means operable during said scanning direction carriage movement for establishing a relatively rigid coupling between said power source and said carriage; and
   means operable during said return direction carriage movement for establishing a force absorbing, resilient coupling between said power source and said carriage.

2. A copier in accordance with claim 1 wherein said interconnecting means includes first and second collars coaxially mounted in inner and outer relation with respect to one another with one of said collars connected to said carriage and the other to said power source, said first collar having a groove extending into the peripheral surface facing said second collar, said second collar having a shoulder extending in generally radially outward direction from the peripheral surface thereof into said groove, said resilient coupling establishing means including a spring means and means retaining said spring means in said groove between an end wall thereof and a face of said shoulder.

3. In a copier/duplicator having a plurality of moving, xerographic process related elements including means having a photoconductive surface for receiving images of scanned original documents, image developing means and copy sheet conveying means for transferring the image from said photoconductive surface onto copy sheets and fixing said images thereon, said copier/duplicator further including a power source connected for operating one or more of said elements including at least said conveying means, a carriage and means movably mounting said carriage for reciprocably scanning original documents to transfer the image thereof to said photoconductive surface, means interconnecting said power source to said movable mounting means and being selectively operable for causing said carriage to move sequentially in first and second directions thereby providing said reciprocal carriage movement, an improvement in said interconnecting means comprising:
   means operable during said carriage first direction movement for establishing a relatively rigid coupling between said power source and said movable mounting means; and
   means operable during the initial portion of said carriage second direction movement for establishing a force absorbing resilient coupling between said power source and said movable mounting means.

4. In a copier/duplicator in accordance with claim 3, said improved interconnecting means comprising first and second cylindrically shaped collars with said second collar being coaxially mounted within said first collar, one of said collars having an arcuate groove therein opening in radially facing relation to the other said collar, said other collar having a shoulder extending in a generally radial direction into said groove, said first direction movement establishing means including a first face of said shoulder and a first end wall of said groove, said second direction operable means including compressibly resilient means retained in said groove between the other face of said shoulder and the other end wall of said groove.

5. Copier/duplicator interconnecting means in accordance with claim 4 wherein said shoulder first face and said groove first end wall both slope in a direction tangential to the circumferential interface between said collars.

6. Copier/duplicator means in accordance with claim 4 wherein said groove is in said first collar and said first end wall thereof slopes tangentially towards the circumferential surface of said second collar, said shoulder is on said second collar with said first face thereof sloping tangentially towards the circumferential surface of said second collar and with said other face being in radially extending relation from said second collar surface, said resilient means being a spring retained between said second collar other face and said groove other end wall.

7. In a copier having a mechanical power source and a carriage mounted for reciprocal motion including movement in at least a scanning direction and a return direction, an improved means for interconnecting said power source and said carriage comprising:
   a hub having a shoulder extending from the outer peripheral surface thereof for forming a radial face;
   means selectively operable for coupling said hub to said power source during the time period said carriage is to move in said return direction;
   a collar having a hollow interior for receiving said hub with a groove extending thereinto along a portion of the circumference thereof and opening in facing relation towards said hub with said hub shoulder extending into said groove;

spring means;

means retaining said spring means between said shoulder radial face and an end wall of said groove in a position for causing compression of said spring means whenever said selectively operable means is actuated; and means coupling said collar for driving said carriage.

8. A method for driving a copier carriage mounted for reciprocal movement through first and second oppositely oriented directions by a power source connected for providing operating power to elements of the copier other than the carriage, comprising the steps of:

selecting movement of said carriage in the first direction for a predetermined period of time;

establishing a firm coupling between the power source and the carriage in response to said selecting step; and interposing a shock absorbing coupling between the power source and the carriage after said predetermined period of time.

* * * * *